US011328919B2

(12) United States Patent
Artaev et al.

(10) Patent No.: US 11,328,919 B2
(45) Date of Patent: May 10, 2022

(54) TWO-STAGE ION SOURCE COMPRISING CLOSED AND OPEN ION VOLUMES

(71) Applicant: LECO Corporation, St. Joseph, MI (US)

(72) Inventors: Viatcheslav Artaev, St. Joseph, MI (US); Georgy Y. Tikhonov, St. Joseph, MI (US)

(73) Assignee: LECO Corporation, St. Joseph, MI (US)

( * ) Notice: Subject to any disclaimer, the term of this patent is extended or adjusted under 35 U.S.C. 154(b) by 0 days.

(21) Appl. No.: 17/053,557

(22) PCT Filed: May 8, 2019

(86) PCT No.: PCT/US2019/031298
§ 371 (c)(1),
(2) Date: Nov. 6, 2020

(87) PCT Pub. No.: WO2019/217541
PCT Pub. Date: Nov. 14, 2019

(65) Prior Publication Data
US 2021/0233760 A1     Jul. 29, 2021

Related U.S. Application Data

(60) Provisional application No. 62/670,435, filed on May 11, 2018.

(51) Int. Cl.
*H01J 49/00*     (2006.01)
*H01J 49/10*     (2006.01)
*G01N 30/72*     (2006.01)

(52) U.S. Cl.
CPC ........ *H01J 49/107* (2013.01); *G01N 30/7206* (2013.01)

(58) Field of Classification Search
CPC .. H01J 49/14; H01J 49/00; H01J 49/04; H01J 49/10; H01J 49/40; G01N 30/72
(Continued)

(56) References Cited

U.S. PATENT DOCUMENTS 3,461,285 A * 8/1969 Werner .................. H01J 49/14
                                                             250/396 R
3,555,272 A * 1/1971 Munson ................ H01J 49/145
                                                             250/424
(Continued)

FOREIGN PATENT DOCUMENTS

EP           2363877 A1 *   9/2011           H01J 49/24
EP           2363877 A1    9/2011
JP        2016115674 A    6/2016

OTHER PUBLICATIONS

International Search Report dated Aug. 29, 2019, relating to PCT/US2019/031298.

(Continued)

*Primary Examiner* — Michael Maskell
(74) *Attorney, Agent, or Firm* — Honigman LLP

(57) ABSTRACT

An ion source includes a base, a first chamber, a second chamber and an extractor. The first chamber is disposed downstream of the base and defines a first internal volume having a first pressure. The second chamber is disposed downstream of the first chamber and defines a second internal volume having a second pressure. The second pressure is less than the first pressure. The repeller electrode is disposed within the first chamber. The extractor is disposed downstream of the second chamber.

18 Claims, 3 Drawing Sheets

Figure 1:
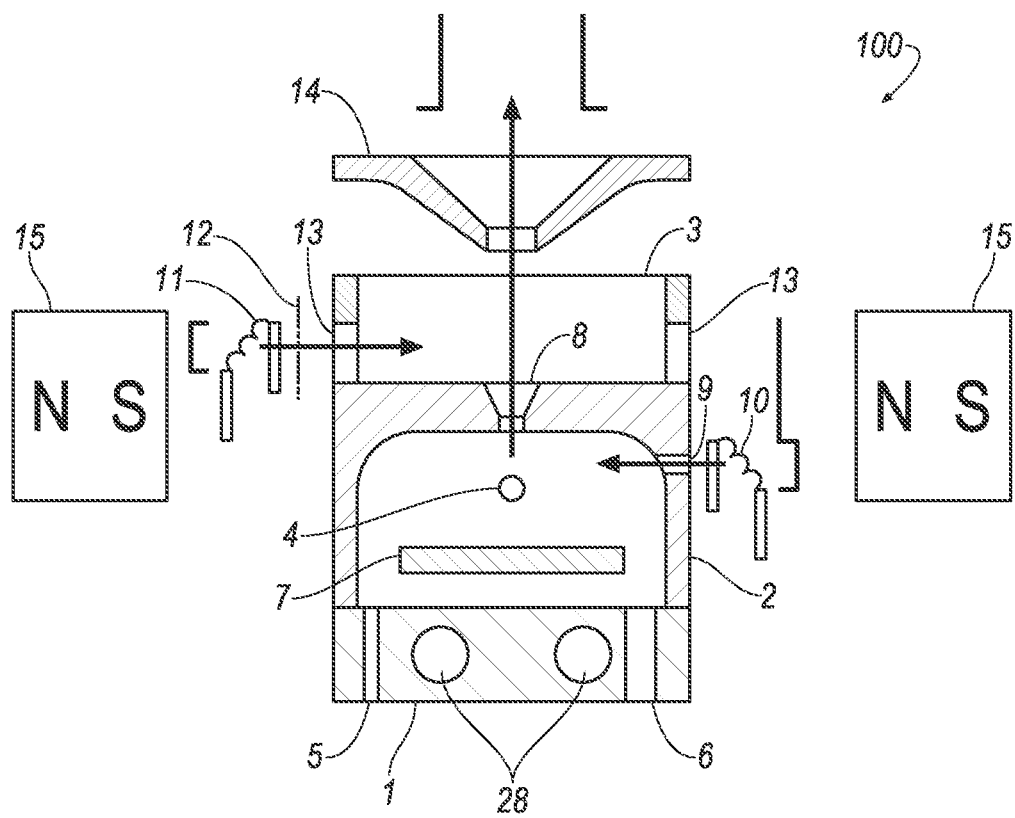

(58) Field of Classification Search
USPC .... 250/281, 282, 288, 423 R, 424, 426, 427
See application file for complete search history.

(56) References Cited

U.S. PATENT DOCUMENTS

| | | | | |
|---|---|---|---|---|
| 3,849,656 | A * | 11/1974 | Wallington | H01J 5/02 |
| | | | | 250/424 |
| 3,924,134 | A * | 12/1975 | Uman | H01J 27/14 |
| | | | | 250/423 R |
| 3,984,692 | A * | 10/1976 | Arsenault | H01J 49/145 |
| | | | | 250/423 R |
| 4,016,421 | A * | 4/1977 | Hull | H01J 49/0422 |
| | | | | 250/281 |
| 4,749,912 | A * | 6/1988 | Hara | H01J 27/08 |
| | | | | 315/111.81 |
| 5,539,274 | A * | 7/1996 | Araki | H01J 37/3266 |
| | | | | 313/362.1 |
| 6,331,702 | B1 | 12/2001 | Krutchinsky et al. | |
| 7,005,634 | B2 * | 2/2006 | Shiokawa | H01J 49/04 |
| | | | | 250/288 |
| 7,176,454 | B2 | 2/2007 | Hayden et al. | |
| 2017/0168031 | A1 * | 6/2017 | Verenchikov | H01J 49/067 |
| 2017/0278688 | A1 * | 9/2017 | Verenchikov | H01J 49/0031 |

OTHER PUBLICATIONS

Japanese Patent Office, Office Action for Application No. 2020-561798 dated Oct. 12, 2021.
Japanese Patent Office, Office Action for Application No. 2020-561798 dated Jan. 19, 2022.

* cited by examiner

TWO-STAGE ION SOURCE COMPRISING CLOSED AND OPEN ION VOLUMES

CROSS-REFERENCE TO RELATED APPLICATIONS

This application claims priority under 35 U.S.C. § 371 to Patent Cooperation Treaty Application No. PCT/US2019/031298, filed May 8, 2019, which claims priority under 35 U.S.C. § 119(e) to U.S. Provisional Application No. 62/670,435, filed May 11, 2018. The disclosures of these prior applications are considered part of the disclosure of this application and are hereby incorporated by reference in their entireties.

FIELD

The present disclosure relates generally to a two-stage ion source for mass spectrometry, and more particularly to a two-stage ion source comprising a closed ion volume and an open ion volume.

BACKGROUND

This section provides background information related to the present disclosure and is not necessarily prior art.

Mass spectrometry and, specifically, sample analysis, may employ gas chromatography-mass spectrometry (GC-MS) or two-dimensional gas chromatography-mass spectrometry (GCxGC-MS). First, gas chromatographic separation of the vaporized (or gaseous) sample may be performed with helium used as the carrier gas. The sample may be delivered into the ion source with a capillary column passing through the transfer line directly coupled into the source ion volume. The pressure in the vacuum chamber, where the ion source is installed, may be maintained between 1E-5 to 1E-3 mb vacuum. The pressure in the source ion volume, where ionization of the sample molecules takes place, may be between 1E-5 to 3 mb, depending on the design of the source ion volume and corresponding ionization method. The analyte molecules, together with any background molecules and the carrier gas molecules, may be ionized via electron ionization (EI), chemical ionization (CI), electron capture negative ionization (ECNI), photo ionization (PI), or any other suitable ionization mechanisms. Ions may be transported to the mass analyzer by means of the ion transfer interface and identified according to their mass-to-charge ratios of molecular ions, quasi-molecular ions and/or fragment ions. A large variety of ion transfer interfaces exist. For example, ion transfer interfaces may include simple interfaces such as a single aperture or an einzel lens, or complex interfaces such as multiple ion lenses and RF ion guides. Typical mass analyzers include, among others, time-of-flight, quadrupole and various ion traps.

In mass spectrometry and, specifically, sample analysis employing GC-MS or GCxGC-MS, generally a user has to select desirable ionization type before starting the spectra acquisition, since most commercial GC-MS ion sources are single mode (e.g., electron ionization (EI) and chemical ionization (CI)). Field ionization (FI), photo ionization (PI) and various other sources are also available. Some commercially available sources offer quick replacement procedures, without the need to vent and re-evacuate the whole instrument's vacuum system. Still, when switching the ion source, there is a certain time delay needed for outgassing, heating, and source temperature stabilization before the analysis can start.

Known systems attempt to minimize the time delay between performing analysis with different ionization types, ideally within the time width of a single chromatographic peak. This would be feasible with the same source assembly being able to employ different ionization types. However, optimal electron ionization and chemical ionization take place at vastly different ion volume pressure, (e.g., 1E-5 to 1E-2 mb for EI, and 0.1 to 3 mb for CI and ECNI). Covering this pressure gap by changing the gas flow rate alone is not feasible, due to the limited pumping speed of available high vacuum pumps (normally 100 to 1000 liters per second). Accordingly, exit apertures of an ion volume of closed type EI sources have a much greater total area compared to those of CI sources. Open EI sources are constructed with meshes and utilize wide open gaps between ion optical elements. To overcome these limitations, several commercial solutions have been previously proposed, employing mechanically-resizable ion volume apertures. This, however, may affect analytical characteristics of the source, as mechanically movable elements are more difficult to maintain at a uniform temperature (typical GC ion source temperatures are between 120 and 350 degrees Centigrade). Isothermal properties of the source are important for avoiding cold and hot spots that can cause sample adsorption and degradation, and adversely affect the chromatographic peak shapes and increase fragmentation.

SUMMARY

This section provides a general summary of the disclosure, and is not a comprehensive disclosure of its full scope or all of its features.

One aspect of the present disclosure provides an ion source. The ion source includes a base, a first chamber, a second chamber, a nozzle, a repeller electrode, and an extractor. The first chamber is disposed downstream of the base and defines a first internal volume having a first pressure. The second chamber is disposed downstream of the first chamber and defines a second internal volume having a second pressure. The second pressure is less than the first pressure. The repeller electrode is disposed within the first chamber. The nozzle is disposed between the first chamber and the second chamber. The extractor is disposed downstream of the second chamber.

The ion source may include one or more of the following features. In some implementations, the first chamber includes a first contact area and the second chamber includes a second contact area engaging the first contact area. The first contact area may directly engage the second contact area. The first contact area may include a first polished metal surface and the second contact area may include a second polished metal surface directly engaging the first polished metal surface.

In some implementations, the first chamber includes an aperture in fluid communication with the first chamber and the second chamber. The aperture may define a frustoconical shape. The aperture may be configured to form a molecular beam from sample molecules flowing from the first chamber to the second chamber.

In some implementations, the first chamber includes a first internal surface defining the first volume and the second chamber includes a second internal surface defining the second volume. The first internal surface and the second internal surface may be isothermal.

In some implementations, the ion source is configured to produce one or more of positive chemical ionization mass spectra, negative chemical ionization mass spectra, an electron capture negative ionization mass spectra, a photoionization mass spectra, or an electron ionization mass spectra. The ion source may be configured to produce a combination of chemical ionization and electron ionization mass spectra.

In some implementations, the ion source includes a first filament disposed outside of the first chamber. The first chamber may define a first aperture configured to receive a first electron beam emitted from the first filament.

In some implementations, the ion source includes a second filament disposed outside of the second chamber. The second chamber may define a second aperture configured to receive a second electron beam emitted from the second filament. The first filament may include a first reflector. The second chamber may define a third aperture. The first reflector may be configured to receive the second electron beam through the third aperture. In some examples, the ion source includes a third filament disposed outside the second chamber and against the third aperture.

In some implementations, the ion source includes at least one magnet disposed outside of the first chamber and the second chamber. The magnet may be configured to generate magnetic field lines through at least one of the first volume and the second volume and parallel to the electron beam direction. The at least one magnet may include two appropriately shaped pole pieces. In some implementations, the at least one magnet includes two magnets.

In some implementations, the first chamber includes an opening configured to receive a capillary column from a gas chromatograph. The first chamber may include a frustoconical aperture in fluid communication with the opening. The opening may define a first dimension and a second dimension extending in a direction perpendicular to the first dimension. A ratio of the first dimension to the second dimension may be between approximately 1:4 and 1:6. The first dimension may define a diameter of the opening and the second dimension may define a length of the opening.

In some implementations, the ion source is disposed within a mass spectrometer.

According to another aspect of the present disclosure, a single source assembly may include a tandem arrangement of two ionization volumes configured to combine two ionization types (e.g., CI and EI). A gaseous sample with a GC carrier gas (and reagent gas for chemical ionization, if any) first enters the first volume (CI zone) having relatively high internal pressure, and then, through a small opening (e.g., a nozzle), is transferred to the second volume (EI zone) operating at near background vacuum pressure due to its wide openings into a vacuum system of the spectrometer. This ion source type may include two separate filaments for generating electrons (e.g., one filament for each ion volume), and may be capable of producing separate EI, separate CI, combination EI/CI, and closely alternating EI/CI spectra.

Yet another aspect of the present disclosure relates to a tandem ion source. In some implementations, the tandem ion source is disposed in a GC-MS mass spectrometer. The tandem ion source may include a closed ion volume, an open molecular beam ionization zone or volume, and an extraction electrode. The open volume may be in fluid communication with, and downstream of, the closed volume, such that a gaseous sample may sequentially pass through the closed ion volume and into the open volume. The closed ion volume may include relatively high internal pressure configured for chemical ionization (CI). The open volume may include a relatively low pressure configured for open electron ionization (EI) sources. The ion source may be configured to produce one or more ionization modes, including positive CI, negative CI, electron capture negative ionization (ECNI), EI, or combination CI-EI mass spectra. These multiple ionization modes may provide complimentary information about a composition of a sample, and thus simplify interpretation of the mass spectra. The closed ion volume may directly contact the open ion volume such that internal surfaces of the closed and open volumes are isothermal to minimize adsorption or degradation of the sample and to provide narrow and symmetrical chromatographic peak shapes. The sample molecules, along with GC carrier gas and any CI reagent gas, may exit the closed, high pressure ion volume axially through a small conical nozzle and form a molecular beam. Despite the low pressure in the open ionization volume, the local sample density may be high near the molecular beam axis, where the ionization is taking place. The high local sample density may increase the source sensitivity of the tandem ion source. The extraction electrode may be disposed within the open ion volume and may be shaped like a conical skimmer. The shape of the extraction electrode may prevent a significant fraction of unwanted carrier gas molecules from entering an ion transfer interface and negatively affecting a sensitivity of the spectrometer. The shape of the extraction electrode may also direct the on-axis sample ions into optics of the ion interface.

Another aspect of the present disclosure relates to a gas chromatography-mass spectrometry (GC-MS) ion source with tandem ion volumes. The ion volumes may have different internal pressures. For example, the first, closed ionization volume may have a relatively high pressure, suited for chemical ionization (CI), while the second, substantially open ion volume may have a significantly lower pressure, close to the source chamber background pressure, typically found in open electron ionization (EI) sources. The apparatus may be disposed, or included, within a mass spectrometer of a time-of-flight (TOF), quadrupole, ion trap or any other suitable type. If a time-of-flight mass analyzer is utilized, a reflecting or multi-reflecting TOF MS with orthogonal acceleration may be utilized. The source may be equipped with two independent filaments, one for each ion volume, such that the source is capable of producing separate CI, separate EI, combined CI-EI, and alternating CI-EI spectra. The open volume filament may be equipped with a metal grid positioned between the hot filament wire and the ion volume in order to simplify control of the electron emission current at low ionization energies. The open volume filament can also be removed and replaced by an ultraviolet (UV) or visible light beam, thus allowing for photo ionization (PI) while still providing CI in the closed, high pressure, ion volume.

In some implementations, the sample transitions from the high pressure ion volume into the open ion volume through an axial conical nozzle, forming a directed molecular beam with the sample density increased near its axis. The sample may be ionized by a cross electron (or UV light) beam in the area of the increased sample density. At the same time, the open ion volume design, with no repeller electrode, may minimize the surface area exposed to the sample and the electron (or UV light) beam.

In some implementations, the two ion volumes are in direct contact with each other and with the heated source base, such that any surface exposed to the sample is isothermal. Cold spots, that would otherwise cause sample adsorption and result in peak tailing, as well as hot spots, that would otherwise result in sample degradation and excessive fragmentation, are eliminated.

In some implementations, the ion extraction element is shaped like a typical molecular beam skimmer and directs a significant fraction of the light (e.g., low mass) molecules of the GC carrier gas (H2, He) and CI reagent gas away from the entrance into the ion transfer interface, while focusing the heavier ionized analyte ions near the axis. This improves the open ion volume's linear dynamic range and its sensitivity for higher rates of the GC gas flow which is desirable for fast gas chromatographic analysis.

Yet another aspect of the present disclosure provides an ion source having improved analytical performance and usability and configured to simultaneously collect both EI and CI type GC-MS spectra with a single ion source at optimal conditions. In some implementations, the ion source operates in EI and CI modes and includes a closed ionization volume and a substantially open ion volume.

In some implementations, the ion source provides softer ionization and preserves a larger fraction of the molecular ions (without dissociation) and simplifies identification of unknown analytes in the sample.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Figure 2:
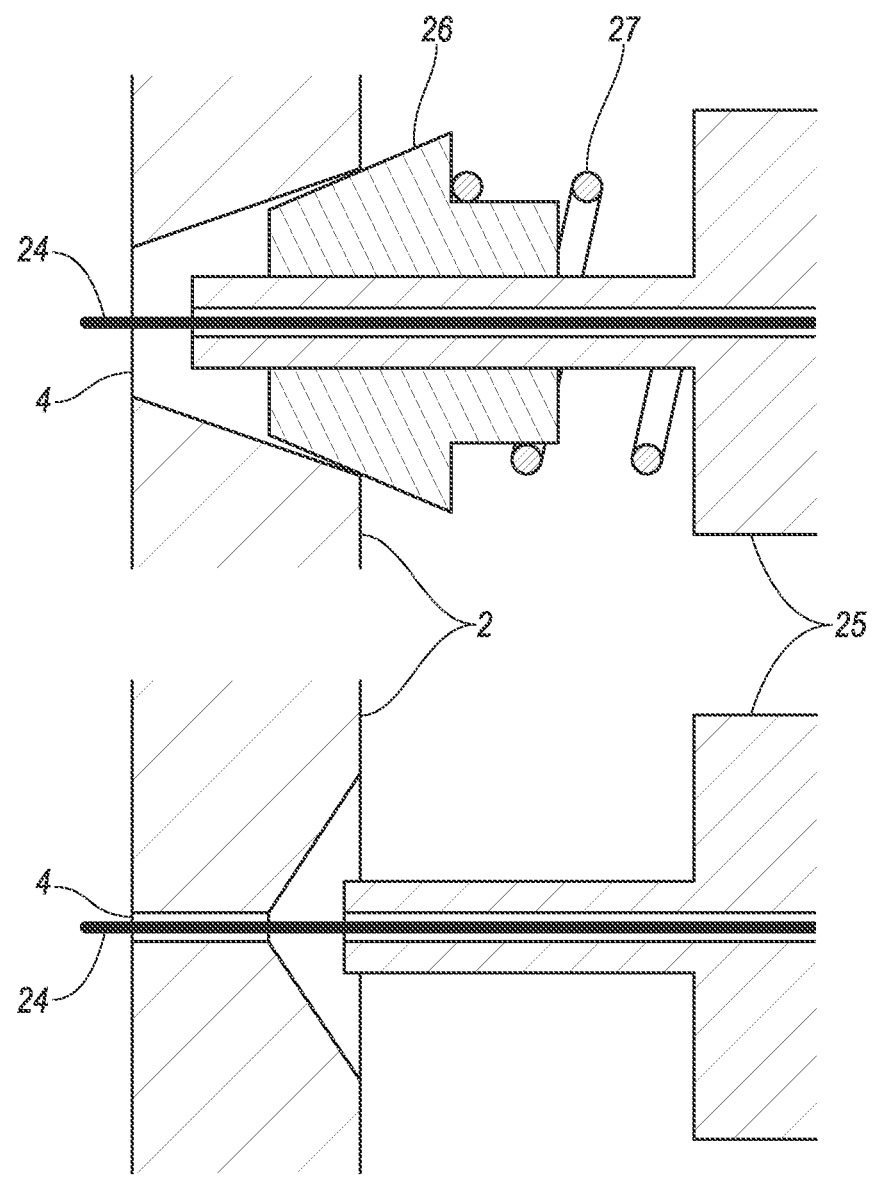
Figure 3:
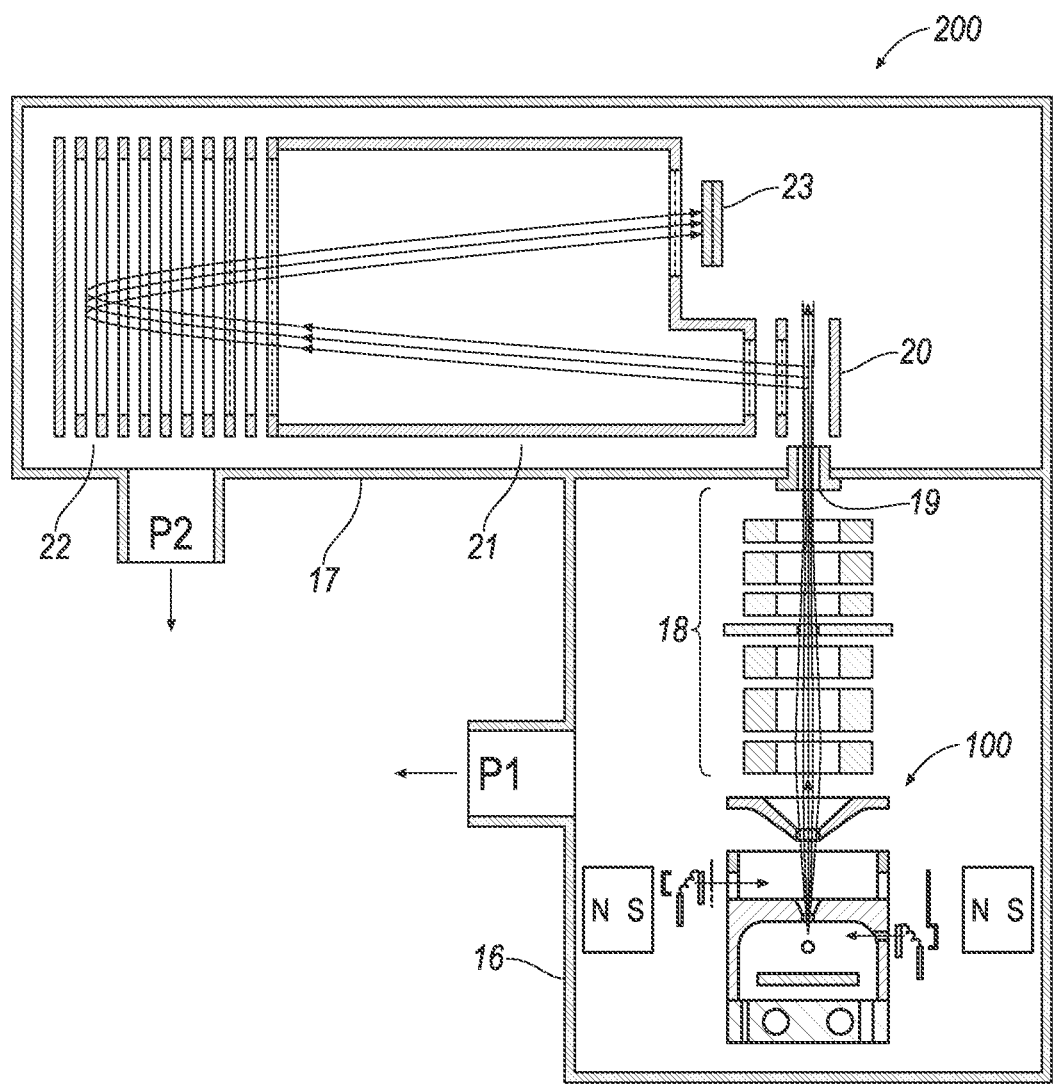

FIG. 1 is a cross-sectional schematic view of a two-stage ion source in accordance with the principles of the present disclosure;

FIG. 2 is a cross-sectional schematic view of a gas-tight connection for a capillary gas chromatography column on a side of the high pressure ion volume in accordance with the principles of the present disclosure; and FIG. 3 is a cross-sectional schematic view of a reflecting time-of-flight mass spectrometer with orthogonal acceleration including a two-stage ion source in accordance with the principles of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Referring to FIG. 1, a two-stage ion source 100, in accordance with the principles of the present disclosure, is shown. The two-stage ion source 100 may include a high pressure ion volume (e.g., chamber) 2, an open ion volume (e.g., chamber) 3 having near-background pressure, and a massive source base 1. The ion volumes 2, 3 may be stacked and securely attached to the source base 1. The source base 1 may include heaters and temperature sensors 28, such that the two-stage ion source 100 is heated by the heaters 28.

The chambers 2, 3 and the base 1 may be formed from a metal, and contact areas of the chambers 2, 3 and the base 1 may be polished, such that a chamber-to-chamber contact area between the chambers 2, 3, and a chamber-to-base contact area between the chamber 2 and the base 1 may be well-polished metal surfaces to facilitate good heat transfer and ensure that the ion source 100 is isothermal. The chambers 2, 3 may each define an inner diameter between 10 to 16 millimeters. The chambers 2, 3 and/or the base 1 may be electrically biased to an ion chamber potential by an external power supply.

The high pressure chamber 2 may include the opening 4 defining a gas-tight connection intended for a capillary column from a single or two-stage gas chromatograph (not shown). Vapors of analyzed sample, together with the GC carrier gas, may enter the high pressure chamber 2 of the source 100 through the connection 4.

The source base 1 may include an additional opening 5 that allows delivery of one or both of a chemical reagent gas or a calibration compound into the source's high pressure ion volume. In some implementations, the chemical reagent gas and the calibration compound are delivered simultaneously through the opening 5. The base 1 may also include an additional opening 6 for introducing the vaporized sample with a Direct Insertion Probe (DIP) or Direct Exposure Probe (DEP). In some implementations, the openings 5, 6 are formed in a wall of the ion volume 2 rather than the source base 1, or any other suitable way, such that the gases and vapors are delivered into the high pressure chamber 2. While the openings 5, 6 are generally illustrated as being open to an atmosphere surrounding the ion source 100, in some arrangements, during use, the opening 5 may be in fluid communication with sources of chemical reagent gas and calibration compound, and the opening 6 may be in fluid communication with the DIP or the DEP.

The high pressure ion volume 2 may include a repeller electrode 7 having an outer dimension between 9 and 13 millimeters. In some implementations, to ensure easy removal, the repeller electrode 7 defines a round or hexagonal shape, such that the outer dimension defines an outer diameter (e.g., a round repeller electrode). The repeller electrode 7 can be independently biased by an external power supply to an electrical potential different from the potential of the ion chamber 2. Electric bias on the repeller electrode 7, or the presence of the repeller electrode 7 inside the high pressure ion volume 2, may not be necessary for operation of the source 100, as the sample ions may be carried outside of the ion volume 2 by the reagent and carrier gas flow alone, and be extracted by the ion optics potential gradients. However, a properly selected (e.g., tuned) voltage of the repeller electrode 7 may greatly improve the sensitivity of the source 100.

The high pressure ion chamber 2 may also include a conical nozzle 8. As illustrated, in some implementations, the nozzle 8 is disposed along an axis and at a top of the chamber 2. The nozzle 8 may define a minimum (e.g., at a narrowest point of the nozzle 8) diameter of about 1 millimeter. Neutral sample vapors or sample ions (e.g., if a filament 10 of the chamber 2 is turned on) may leave the high pressure volume 2 through the nozzle 8 and continue in an axial direction, with some flow expansion, into the open ion volume 3.

The chamber 2 may also include an additional hole 9 on a side of the high pressure ion volume 2. The additional hole 9 may define a diameter of about 0.5 millimeters and may be spaced between 1 and 2 millimeters from the inner top of the chamber 2. During operation, the hole 9 may receive an electron beam emitted by the filament 10, such that the electron beam enters the ion volume 2.

The source 100 may further include magnets 15. In some implementations, the magnets 15 are permanent magnets. The magnets 15 may create or generate a magnetic field having magnetic field lines extending across the ion source assembly 100. The magnetic field directs the electron beam emitted by the filament 10 towards the ion volumes 2, 3 and increases the electron path, thus enhancing the ion yield of the source 100. A small fraction of the sample vapor with reagent and carrier gas may exit through the electron beam hole 9. The molecules of this small fraction, even if ionized in the electron beam, may not be extracted by the interface ion optics and may be pumped away by a vacuum system (not shown) of the source 100.

The source 100 may further include a conical extractor 14. Ionized sample that exits axially through the nozzle 8 into the open ion volume 3 can be accelerated axially by an electric field of the conical extractor 14 and transported further into an ion transfer interface of the mass spectrometer. The shape of the extractor 14 facilitates deflection of the outer beam, which may be depleted of sample and enriched in the GC carrier gas, into the vacuum system for removal.

The extractor 14 may include a centrally-located hole having a diameter between 1.5 and 4 millimeters.

The open ion volume 3 may include a filament 11 and may define one or more openings 13. If the sample is not ionized in the high pressure ion volume 2 by the chemical ionization process because, for example, the filament 10 was off, or because of the chemical properties of the sample, the sample can be ionized in the open ion volume 3 by electron ionization. For example, the filament 11 can be turned on such that an electron beam, emitted by the filament 11, enters and exits the low pressure ion volume 3 through a first of the openings 13. The openings 13 may define a diameter between 2 and 3 millimeters, and may be disposed in a side of the open ion chamber 3. The centerline of the opening 13 may be located from 1 to 5 millimeters away from a bottom of the chamber 3. In some implementations, the filaments 10, 11 include electron reflectors. The reflector of the filament 10 may extend to face one of the opening 13 such that the reflector acts on the electrons emitted by the filament 11. Thus, when the filament 11 is operated, the electrons, influenced by the magnetic field, can travel back-and-forth between the reflectors of the filaments 10, 11, until colliding with the gas or vapor molecules or the walls of the source 100.

The source 100 may also include a metal grid 12. The metal grid 12 may be disposed between the filament 11 and the opening 13 in the side of the open ion chamber 3. The grid 12 may be independently biased by an external power supply to a potential more positive than both the ion volume 3 and the filament 11. The difference between the potential of the grid 12 and the potential of the filament 11 may be between 80 and 300 Volts. The difference between the potential of the grid 12 and the potential of the ion volume 3 may be between 50 to 150 Volts. In some examples, the metal grid 12 can be disposed between filament 10 and aperture 9.

The grid 12 may help to stabilize electron emission current control in two different situations. For example, when the source 100 is loaded with very large amount of the sample, molecules ionized near opening 13 may be repelled back into the ion volume 3 because of positive electric potential on the grid 12. In absence of the grid 12, the ions would be attracted to the filament 11. This additional ion current may disrupt the electron emission current measurement and reduce the filament current control loop stability. The grid 12 helps to achieve wider dynamic range and faster recovery when the ion source 100 is overloaded with large amounts of sample. Additionally, at low electron energies, in a source 100 formed without the grid 12, maximum achievable electron emission current is limited by space-charge as stated in Child's law. The positively-biased (electron accelerating) grid 12 in close proximity of the filament 11 reduces the space charge near the filament and simplifies the filament current control at low electron (ionization) energies.

Electron ionization in the open ion volume 3 can optionally be replaced by photo ionization. For example, the filament 11 can be removed, the length of the reflector of the filament 10 can be shortened, the magnets 15 can be shifted lower towards the source base 1, and the through opening 13 can be enlarged to at least 4 millimeters in diameter. A UV light source (not shown) may be positioned so that a light beam of the UV light source illuminates the sample beam exiting through the nozzle 8.

Ions produced in the open ion volume 3 by electron or photo ionization may be accelerated axially by the extractor 14. At any given time, the filament 10 can be turned on to record a CI spectrum, the filament 11 can be turned on to record an EI spectrum, or both filaments 10, 11 can be turned on to record a combination EI/CI spectrum. For photo ionization, only CI, PI, or the combination CI/PI spectra may be recorded.

Unlike in most commercial closed EI sources, the open ion volume 3 may not include a repeller electrode. The ions may be directed by an axial downstream motion of the molecular beam and by an electric field of the conical extractor 14.

The base 1, the volumes 2, 3, the repeller electrode 7, and the extractor 14 may be constructed of any suitable inert and non-magnetic metal or metal alloy well known to those skilled in the art.

In view of the tandem arrangement of the high pressure and open ion volumes 2, 3, respectively, the fraction of analyte vapor transferred into the open ion volume 3 through the nozzle 8 may be maximized, and sample losses through other openings on the high pressure ion chamber 2 may be minimized.

Referring to FIG. 2, variants of the capillary GC column 24, and a transfer line 25 connection of the capillary GC column 24 to the high pressure ion chamber 2, are shown. Since the transfer line 25 and the ion volume 2 generally have different electric potentials, the transfer line 25 may not be in direct mechanical contact with the ion volume 2. The traditional way to seal the capillary column opening of the CI source is shown on the upper part of FIG. 2. For example, a conical ceramic spacer 26 may fit closely on a tip of the transfer line 25 and may be pressed by a spring 27 against the conical opening 4 in the high pressure ion volume 2. Despite the close fit, the ceramic spacer 26 can freely slide on the tip of the transfer line 25. Gas tightness of the seal depends on dimensional tolerances of the mating parts (e.g., 2, 26) and a force generated by the compressed spring 27. Due to thermal cycling of the ion source (e.g., source 100), the transfer line 25, and therefore the spring 27, as well as the generally large size of the opening 4, reagent gas may leak through the opening 4 in CI sources, which can result in variations of the required reagent gas flow.

The lower part of FIG. 2 illustrates a transfer line 25 for an ion source (e.g., ion source 100) in accordance with the principles of the present disclosure. The transfer line 25 may not directly contact the high pressure ion chamber 2. A ratio of the diameter of the opening 4 to the length of the opening 4 may be between 1:4 and 1:6. In some implementations, the diameter of the opening 4 may be between 0.5 to 0.7 mm. Even when not obstructed by a capillary column, due to gas flow properties at the CI source operational pressures, gas flow resistance of this opening 4 may assure that most of the outflow is through the nozzle 8 (e.g., FIG. 1). An outer side of the high pressure ion volume 2 may include or define a shallow conical lead-in in fluid communication with the opening 4 to simplify insertion of the capillary GC column 24.

Due to flexibility of contemporary capillary columns, precise alignment between the transfer line 25 and the opening 4 may not be required. The transfer line 25 shown in the lower part of FIG. 2 provides better reproducibility between analysis runs and instruments and requires less wearable parts.

Referring to FIG. 3, a reflecting time-of-flight (TOF) mass spectrometer 200 with orthogonal acceleration is illustrated including the two-stage ion source 100. It will be appreciated that the two-stage ion source 100 could also be used with a multi-reflecting TOF instrument (e.g. PEGASUS® GC-HRT by LECO), a quadrupole mass analyzer, an ion trap, or any other suitable mass analyzer. The tandem source 100 may produce a generally continuous ion beam; however, the source 100 may produce alternating CI and EI spectra by switching between two filaments (e.g., filaments 10, 11) (with some brief ion current dropout in between).

The spectrometer 200 may include a source-interface vacuum chamber 16, a mass analyzer vacuum chamber 17, and an ion transfer interface 18. The continuous ion beam may be transmitted from the source-interface vacuum chamber 16 to the mass analyzer vacuum chamber 17 by the ion transfer interface 18.

The mass analyzer 17 may include an orthogonal accelerator 20, a drift region, an ion mirror 22, and a charged particle detector 23. In the mass analyzer 17, the ion beam may be subjected to (i) pulsed acceleration in the orthogonal accelerator 20, (ii) two constant speed trajectory segments in the drift region 21, and (iii) reflection in the ion mirror 22 in between. Finally, the ion mass spectrum may be recorded by means of the charged particle detector 23. In some implementations, the charged particle detector 23 includes a microchannel plate.

Two vacuum chambers 16, 17 may be independently pumped by high vacuum pumps P1 and P2, respectively. The pumps P1, P2 may include turbomolecular pumps having a pumping speed between 200 and 400 liters/second and backed by an appropriate roughing pump. In some implementations, instead of two discrete turbomolecular pumps P1, P2, the spectrometer 200 may include a single multi-inlet turbo pump (not shown).

The spectrometer 200 may also include a small orifice 19 disposed between the two vacuum chambers 16, 17. The orifice 19 may enable differential pumping. Under typical GC carrier gas flow of one standard mL/min and additional CI reagent gas flow of one standard mL/min, operational pressure in the vacuum chamber 16 may be about 1.4E-4 mb, while pressure in vacuum chamber 17 may be between 5E-6 to 1E-8 mb, depending on the size of the orifice 19, the leak tightness of the chamber 17, and outgassing rates of materials inside the chamber 17. Under said gas flow settings, pressure in the ion volume 2 may be approximately equal to 0.3 mb (hence the name "high pressure ion volume"). Chemical ionization may require reagent gas pressure between 0.1 and 3 mb, whereas closed electron ionization sources may operate at a background gas pressure between 1E-3 to 1E-2 mb. In the absence of a CI reagent gas (commonly methane, iso-butane, or ammonia), analyte substances may undergo a charge exchange reaction with ionized GC carrier gas (typically helium or hydrogen). High energy transfer in this reaction often results in analyte dissociation. Resultant positively-charged ion mass spectrum is similar to EI spectrum for the same analyte. This ionization mode may not discount utility of EI ionization in the open ion volume. Pressures in the two ion volumes 2, 3, may differ by three orders of magnitude. Thus, the open ion volume 3 is capable of electron ionization with greater linear dynamic range and better sensitivity.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An ion source comprising:
a base;
a first chamber comprising a first contact area including a first polished contact metal surface, the first chamber fluidly coupled to, and disposed downstream of, the base, the first chamber defining a first internal volume having a first pressure;
a second chamber comprising a second contact area including a second polished metal surface directly engaging the first polished metal surface, the second chamber fluidly coupled to, and disposed downstream of, the first chamber, the second chamber defining a second internal volume having a second pressure less than the first pressure;
a nozzle disposed between the first chamber and the second chamber; and
an extractor disposed downstream of the second chamber.

2. The ion source of claim 1, further comprising a repeller electrode disposed within the first chamber.

3. The ion source of claim 1, wherein the base includes a first contact area and the first chamber includes a second contact area engaging the first contact area.

4. The ion source of claim 1, wherein the nozzle includes an aperture defining a frustoconical shape in fluid communication with the second chamber.

5. The ion source of claim 1, wherein the first chamber includes a first internal surface defining the first internal volume and the second chamber includes a second internal surface defining the second internal volume, and wherein the first internal surface and the second internal surface are isothermal.

6. The ion source of claim 1, wherein the ion source is configured to produce one or more of a positive chemical ionization mass spectra, a negative chemical ionization mass spectra, an electron capture negative ionization mass spectra, a photoionization mass spectra or an electron ionization mass spectra.

7. The ion source of claim 6, wherein the ion source is configured to produce a combination of chemical ionization and electron ionization mass spectra.

8. The ion source of claim 1, further comprising a first filament disposed outside of the first chamber, the first chamber defining a first aperture configured to receive a first electron beam emitted from the first filament.

9. The ion source of claim 8, further comprising a second filament disposed outside of the second chamber, the second chamber defining a second aperture configured to receive a second electron beam emitted from the second filament.

10. The ion source of claim 9, wherein the first filament includes a first reflector, and the second chamber defines a third aperture, and wherein the first reflector is configured to receive the second electron beam through the third aperture.

11. The ion source of claim 1, further comprising a magnet disposed outside of the first chamber and the second chamber and configured to generate magnetic field lines through at least one of the first internal volume and the second internal volume.

12. The ion source of claim 1, wherein the first chamber includes an opening configured to receive a capillary column from a gas chromatograph.

13. The ion source of claim 12, wherein the first chamber includes a frustoconical aperture in fluid communication with the opening.

14. The ion source of claim 13, wherein the opening defines a first dimension and a second dimension, the second dimension extending in a direction perpendicular to the first dimension, a ratio of the first dimension to the second dimension being between approximately 1:4 and 1:6.

15. The ion source of claim 14, wherein the first dimension defines a diameter of the opening and the second dimension defines a length of the opening.

16. A mass spectrometer comprising one of a direct insertion probe, a direct exposure probe, a membrane, or a gas chromatograph including the ion source of claim 1.

17. The mass spectrometer of claim 16, wherein the gas chromatograph is a two-dimensional gas chromatograph.

18. An ion source comprising:
a base;
a first chamber fluidly coupled to, and disposed downstream of, the base, the first chamber defining a first internal volume having a first pressure, wherein the first chamber includes:
an opening configured to receive a capillary column from a gas chromatograph; and
a frustoconical aperture in fluid communication with the opening;
a second chamber fluidly coupled to, and disposed downstream of, the first chamber, the second chamber defining a second internal volume having a second pressure less than the first pressure;
a nozzle disposed between the first chamber and the second chamber; and
an extractor disposed downstream of the second chamber.

* * * * *